Dec. 22, 1964  C. J. KOESTER ET AL  3,162,713

INTERFERENCE MICROSCOPE

Filed May 25, 1962  4 Sheets-Sheet 1

HAROLD OSTERBERG
CHARLES J. KOESTER
INVENTORS.

BY
BLAIR, SPENCER & BUCKLES

ATTORNEYS.

Dec. 22, 1964 C. J. KOESTER ETAL 3,162,713
INTERFERENCE MICROSCOPE
Filed May 25, 1962 4 Sheets-Sheet 2

HAROLD OSTERBERG
CHARLES J. KOESTER
*INVENTORS.*

BY
BLAIR, SPENCER & BUCKLES

ATTORNEYS.

Dec. 22, 1964  C. J. KOESTER ETAL  3,162,713
INTERFERENCE MICROSCOPE
Filed May 25, 1962  4 Sheets-Sheet 3

HAROLD OSTERBERG
CHARLES J. KOESTER
*INVENTORS*

BY
BLAIR, SPENCER & BUCKLES

ATTORNEYS.

Dec. 22, 1964  C. J. KOESTER ETAL  3,162,713
INTERFERENCE MICROSCOPE

Filed May 25, 1962  4 Sheets-Sheet 4

HAROLD OSTERBERG
CHARLES J. KOESTER
*INVENTORS.*

BY BLAIR, SPENCER & BUCKLES

ATTORNEYS.

United States Patent Office 3,162,713
Patented Dec. 22, 1964

3,162,713
INTERFERENCE MICROSCOPE
Charles J. Koester, South Woodstock, Conn., and Harold Osterberg, Sturbridge, Mass., assignors to American Optical Company, Southbridge, Mass., a voluntary association of Massachusetts
Filed May 25, 1962, Ser. No. 201,232
9 Claims. (Cl. 88—39)

This invention relates to optical interference systems, and more particularly to detachable apparatus adapted to convert a conventional microscope into a precision interference microscope. This application is a continuation-in-part of our earlier co-pending application Serial Number 765,248, filed October 3, 1958, which on May 28, 1962, was allowed to become abandoned.

In the past, various forms of optical instruments have been designed and marketed for use in interferometry and particularly for interference microscopy, i.e., for measuring the optical path difference between a specimen object or particle and its surround in order to determine the thickness, solution concentration or optical characteristics of the specimen.

These known instruments are all complex and expensive, and the various optical elements required for interferometry are generally incorporated directly in the bodies of the instruments themselves.

A principal object of the present invention is to provide a substantially self-contained interferometer adapted for use with other optical apparatus. Another object of the invention is to provide an economical detachable interferometer of the above character adapted for use with a conventional microscope. Still another object of the invention is to provide an interferometer of the above character in which substantially all of the operative elements are mounted in a detachable eyepiece unit. A further object of the invention is to provide apparatus of the above character in which two areas of the first focal plane are translated, one relative to the other, into coincidence or superposition. Another object of the invention is to provide apparatus of the above character embodying elements adapted to adjust the relative optical path lengths of separate bundles of light rays passing through the apparatus. A further object of the invention is to provide apparatus of the above character embodying elements adapted to adjust the relative intensities of separate bundles of light rays passing through the apparatus. An additional object of the invention is to provide apparatus of the above character adapted for use with either polarized light or unpolarized light. A further object of the invention is to provide interferometer apparatus of the above character for measuring the optical path difference between an object and its surround with greater precision and accuracy than has heretofore been possible, and which affords higher contrast and better extinction than heretofore obtainable. Another object of the invention is to provide apparatus of the above character which does not require extreme precision in the manufacture of its optical components. An additional object of the invention is to provide apparatus of the above character which avoids the use of complex birefringent elements, expensive interferometer plates or other beam splitters. A further object is to provide economical apparatus of the above character which may be easily operated by the user.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

To obtain visible interference between two light rays or waves, it is necessary that they be of the same wavelength and that there be a constant phase difference between two rays or waves when they pass through a point in the image plane where the interference is observed. Two light rays or waves capable of producing interference at a point of an image plane are called coherent.

Interference microscopes generally utilize plane polarized light and incorporate a birefringent or partially reflective element (beam splitter), which divides the light into separate beams, only one of which passes through or is focused at the object. These beams are then recombined by a birefringent or partially reflective element. In order to obtain interference, such beams must be recombined in exactly the same way they were split. That is, each pair of rays originating at a given point at the first beam splitter must be recombined at a corresponding point at the second beam splitter. Thus the cross sections of the combined beams at the beam splitters must be exactly congruent. The phase retardation introduced by the object then causes interference, which is measured to determine the amount of this retardation. Because the two beams must be brought into exact congruence the optical elements placed in the two beams must be identical and precisely aligned in order to obtain good contrast.

Interference microscopes generally incorporate the optical elements of a conventional microscope, including a light source, a condenser lens system, an object stage, and a focusing system including an objective lens system and an eyepiece lens system. In order to be adapted for interferometry, interference microscopes normally also include light polarizing and analyzing means and birefringent elements for dividing and recombining the separate beams of light. The presence of these birefringent elements in the focusing system adversely affects the focusing and imaging of the light passing through the system, reducing the sharpness and clarity of the images observed therewith.

Interference microscopes employing partially reflective beam splitters such as those shown in United States Patent 2,660,922, issued to J. St. L. Philpot, December 1, 1953, either require a multiplicity of optical elements—two condensers, two objectives, several mirrors, etc.—or employ vertical illumination of the object. When vertical illumination is employed, part of the illuminating light is reflected and scattered at the surface of each optical element of the microscope. This back-reflected and scattered light greatly reduces the contrast obtainable. Further, vertical illumination can only conveniently be utilized in a conventional microscope for interferometric observation of the surface of an object.

The present invention is designed to achieve the objectives and advantages of conventional interferometry apparatus without requiring the use of birefringent elements in dividing and recombining separate beams of light, although in some instances, as shown below, such elements might be desirable; for example, a Wollaston prism. This invention is called an "interferometer eyepiece" because it is designed to translate two areas of an image plane into coincidence or superposition in the neighborhood of the eyepiece so that interference effects between these two areas may be observed and measured. One of these areas includes the specimen particle observed, while the other area is selected to include only the surround which serves as a reference area. The invention thus accomplishes the purpose of far more complicated and expensive interference apparatus while avoiding many of the disadvantages thereof and providing a sharper and better defined image.

In the present invention the object plane is illuminated with a substantially collimated beam, all of the rays of which are capable of interference with each other. Such a beam may be obtained by first passing the illuminating light through a small pin hole or narrow slit placed at the focus of the sub-stage condenser of a conventional microscope, or by employing a coherent light source such as a laser. Because the illumination employed in the invention is completely coherent over the entire area of the object plane, the specimen area and the reference area of the object plane may be arbitrarily chosen and combined at the interference eyepiece of the invention and an interference image produced. In prior art interference microscopes not employing such fully coherent illumination of the object plane, such arbitrary choices of the areas to be combined cannot be made. Furthermore, the use of a coherent light source for illumination of the object plane in the present invention eliminates the need for polarizing, birefringent or partially-silvered elements in the substage condenser, and the difficulties resulting from the use of these elements are thus avoided.

The interferometer eyepiece of the present invention is particularly well adapted to be incorporated in a unitary housing forming a detachable eyepiece, which may be conveniently installed in optical instruments, such as conventional biological microscopes, in order to adapt them for interference measurements and observations.

Only one simple modification is required to adapt a conventional microscope for use with the interferometer eyepiece of the present invention, although other more complex arrangements could be used. This simple modification would employ a diaphragm provided with a small aperture or narrow slit providing a point or line source of light. The diaphragm is inserted at or near the first focal plane of the substage condenser.

Figures 1, 2, 3, 6:
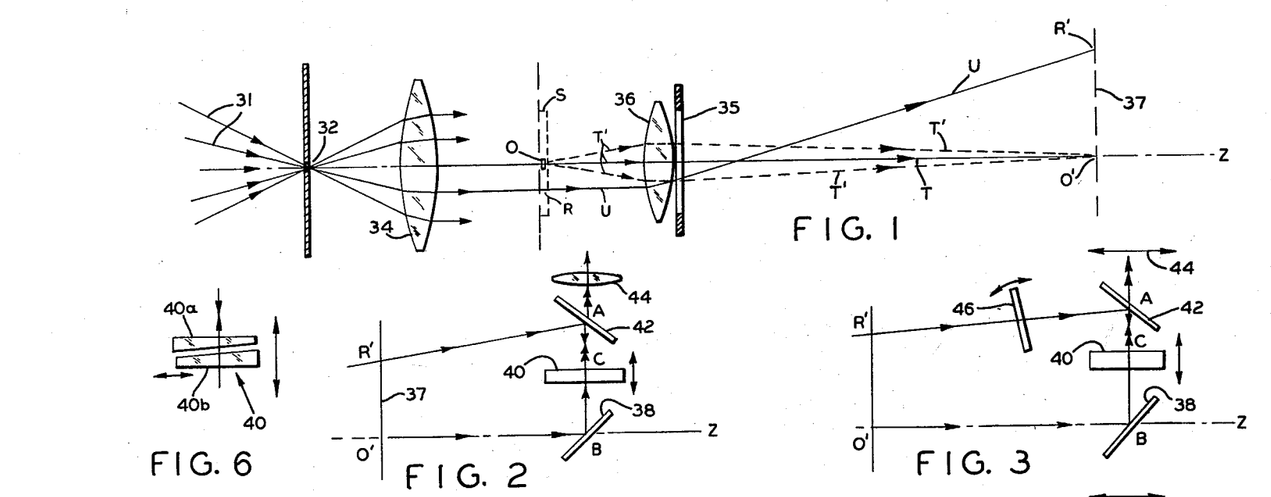
FIGURE 1 is a diagram of a portion of the optical system employed in a conventional microscope with the substage modified according to the teachings of the present invention.
FIGURE 2 is a diagram of an optical system of one embodiment of the present invention designed for use with the microscope of FIGURE 1 and employing a combining element having a partially reflecting surface.
FIGURE 3 is a diagram of the optical system shown in FIGURE 2 including a desirable modification.
FIGURE 6 is a side elevation view of a modified form of one of the optical elements shown in FIGURES 2, 3, 4, and 5.

The principles of operation of the present invention can best be seen with reference to FIGURES 1 and 2, in which one of the most basic embodiments is shown schematically.

A portion of the optical system of a conventional microscope with the substage modified according to the teachings of the present invention is diagrammatically shown in FIGURE 1. Light 31 from a source not shown is focused upon a slit 32 and is thereafter directed by a substage condenser 34 as a collimated beam of parallel rays toward a specimen S containing therein a small object O disposed at the object plane of the instrument. The objective lens system, shown schematically by element 36, focuses light from the object plane at the image plane 37, object point O in specimen S being focused at O', and a reference point R in specimen S being focused at R'. The central opening of diaphragm 35 limits the numerical aperture of the objective.

The slit 32 as shown in preferably narrow and perpendicular to the plane of the sheet of paper on which FIGURE 1 appears. The light traveling from each point in the slit is collimated into a beam of parallel rays each having a substantially plane wave front illuminating the specimen.

Since light from each point in the slit 32 illuminates all points in the object plane, light passing through any point in the object plane is capable of interfering with light passing through any other point in the object plane. Thus, the object is illuminated with light that is substantially coherent at all points of the object plane.

In prior art interference microscopes employing beam splitters, a beam of ordinary incoherent illumination is sheared into two complementary beams at a beam splitter. These two beams are caused to traverse separate optical paths, one path including a reference object plane and the other including a specimen object plane. The two beams are then combined by a second beam splitter. Light rays originating at one point in the first beam splitter are combined at a congruent point in the second beam splitter, and because they have traversed paths of different optical lengths, they interfere.

In the arrangement shown in FIGURE 1, light traveling through the small object O as indicated by ray T, and dotted rays T', T', will be brought to a focus at O' by objective 36. Further, the light passing through reference point R will be brought to a focus at image point R'. If the optical thickness of the specimen is different at O and R, the light rays forming the image points O' and R' being coherent due to the coherent illumination of the object plane will be capable of interfering if they are made to coincide. Furthermore this is true of any pair of arbitrarily chosen points in the object plane when it is illuminated as shown in FIGURE 1. Therefore the congruence or point-for-point correspondence of the object and reference areas required in prior art interference microscopes is not needed with the present invention. Any "reference" portion of the object plane may be superimposed on any selected object area to produce an interference image, without initial beam splitters, matched condensers, matched objectives, or precision alignment of optical elements.

Optical arrangements for superimposing any arbitrarily selected object and reference areas from the coherently illuminated object plane are shown in FIGURES 2 through 19.

An interferometer eyepiece incorporating the principles of the invention is shown schematically in FIGURE 2, which is an extension of FIGURE 1, the points O' and R' being the same in each figure. The central rays R'A and O'B from points R and O are combined and superimposed by the elements of the interferometer eyepiece as follows. Ray O'B is reflected along line BA by reflecting surface 38, which may be a full-silvered mirror, and this reflected ray passes through adjustable beam splitter 40. A portion of ray R'A is reflected by a second beam splitter 42 along line AC, and reflected again by beam splitter 40 along line CA. Ray BA and ray CA are thus brought into superposition, and the portions of each which pass together through beam splitter 42 may be observed via eyepiece 44. The central rays of each beam have thus been traced through the optical elements of the system. The combination of elements 38, 40, and 42 is shown located beyond the objective's image plane 37 in which points O' and R' appear. It will be understood, however, that these elements may be located between the objective 36 and its image plane 37, since the reflections occurring among these elements do not affect the convergence of these separate beams to form the image points R' and O', as traced above for the central rays of the beams.

In the preferred method of illumination, that shown in FIGURE 1, the light 31 from the source (not shown) is focused upon the slit 32. This is known as "Köhler" illumination. The slit may then be regarded as self-luminous. Coherent light issues from each point in the slit and illuminates all points in the specimen. The superimposed images of R' and O', as formed by light from each point in the slit, are composed of coherent illumination. Consequently, when the images of R' and O' are in close superposition, a set of substantially straight interference fringes will be seen through the eyepiece 44. The fringe width can be altered by changing slightly the relative angular adjustments of elements 38, 40 and 42. In particular, it will be possible, when desired, to spread a single fringe over the whole field of view. Beam splitter 40, which is also adjustable along line AB, may be moved linearly, to produce either constructive or destructive interference in the field of view. If a platelike particle is imaged in the field of view, the image of the particle can be made to appear brighter or darker than the image of its surround by said adjustment of beam splitter 40. Thus, contrast in the image can be controlled by moving beam splitter 40. If the slit width of 32 is made very narrow, the energy density can be made almost zero in the image of either the particle or of its surround. Correspondingly the degree of contrast becomes high. It is accordingly desirable to incorporate variable slit-widths in order that the observer can make his own compromise between the level of illumination and degree of contrast as desired.

In general, precision in the measurement of optical path difference will be increased by decreasing the slit width. In the simplest method of measuring the optical path difference between the particle and surround, the angular adjustments of elements 38, 40 and 42 are made so as to form a set of straight fringes over the field of view. If, for example, a plate-like particle is present, a fringe displacement will be seen at the edge of the particle—and this fringe displacement can be readily measured in known manner with unpolarized monochromatic light to determine the optical path difference between particle and surround. This optical path difference may be measured, for example, by the use of a conventional micrometer eyepiece in place of the usual eyepiece 108 shown in FIGURE 13, or properly calibrated dials secured to the rotatable shafts of knobs 116 and 118 may be used to measure the angular displacements thereof as one fringe and then another successive fringe passes a line reticle provided at the image plane of the eyepiece. However, many other techniques for measuring the optical path difference become possible, especially when the light beams R'AC and O'BC, FIGURE 2, are polarized differently by means of polarizing elements. For example, the optical path difference can be measured by the use of such elements as those shown in FIGURES 7 and 8, and more fully described below.

The underlying principle of the invention and the operation of one embodiment are thus shown by FIGURES 1 and 2, in which the upper partially reflecting surface of beam splitter 40 is the element cooperating with reflecting surface 38 and beam splitter 42 to combine the two beams to be interfered. Various other arrangements of optical elements may be employed to combine these two beams, as will be shown below.

While the embodiment shown in FIGURES 1 and 2 will perform the desired interferometry function, it is advantageous to incorporate additional optical elements or modifications in order to increase the flexibility and usefulness of the system. Thus, for example, the adjustment available by moving beam splitter 40 may be relatively coarse, and, as shown in FIGURE 3, a rotatable transparent plate 46 may be incorporated in beam R'A to provide a fine adjustment of the optical path R'A relative to path O'BA. Rotation of plate 46 introduces an increased optical path length in beam R'A, since this beam must travel obliquely through a greater thickness of plate 46 when this plate is rotated out of a position normal to beam R'A.

This fine adjustment of path length may also be achieved by employing a modified form of element 40, shown in FIGURE 6, in which two wedges 40a and 40b are slidably combined so that the sliding relative adjustment will change the optical path length of beam BC by a small amount. This entire structure 40 may also be adjustably movable in the direction of beam BC to permit coarse adjustment of the relative path lengths of the two beams.

Figure 4:
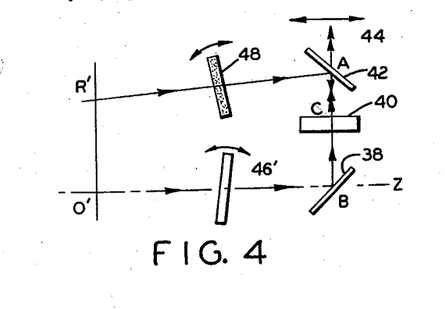
FIGURE 4 is a diagram of the optical system shown in FIGURE 2 including certain other possible modifications.
Figure 5:
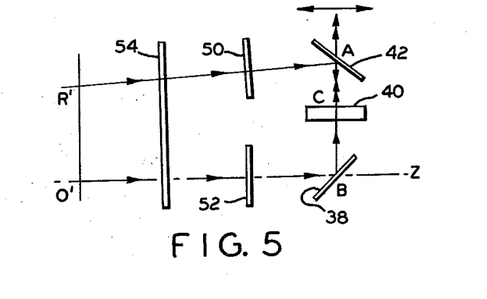
FIGURE 5 is a diagram of the optical system shown in FIGURE 2 including further modifications.

In some cases it may be desirable selectively to reduce the amplitude of the light in beam R'A, and this may be achieved by incorporating a rotatable absorbing plate 48 in beam R'A, as shown in FIGURE 4. Here, the greater path length through plate 48 in its rotated position produces the desired preselected amount of absorption. In this modification, a further fine adjustment of relative path lengths may be accomplished by inserting the rotatable plate 46' in beam O'B, as shown in FIGURE 4. Similar variation of the relative amplitudes of the beams R'A and O'B may be achieved by inserting fixed polarizers 50 and 52 in beams R'A and O'B, as shown in FIGURE 5, these polarizers being respectively oriented with mutually perpendicular azimuths of polarization to transmit light polarized normally in the two beams, with the planes of polarization being respectively normal and parallel to the plane of incidence of the light upon reflecting surfaces 38 and 42, to avoid elliptical depolarization upon reflection by these surfaces. If a rotatable polarizer 54 is placed across both beams, its rotational adjustment about an axis substantially parallel to the system's optic axis O'Z will increase the amplitude of one beam while reducing the amplitude of the other, allowing either beam to be substantially blocked, and permitting a wide selection of relative amplitudes of the two beams. Blocking of one beam permits a careful selection of specimen area to be imaged in the other beam. If the polarizers are not included, similar blocking may be achieved by physically deflecting or impeding either beam by any suitable means, such as an insertable diaphragm (not shown).

While visible interference effects occur in the interferometer eyepiece of the present invention when either polarized or unpolarized light is used, the introduction of polarizers 50 and 52 also adapts the device for use with adjustable elements which may be calibrated to measure quantitatively the phase retardation introduced by a particle relative to its surround. For example, the Sénarmont type compensator is included in the embodiment shown in FIGURE 7, with its quarter-wave plate 56 and its rotatable analyzer 58 (which may be a sheet of transparent polarizing material) inserted as shown between element 42 and eyepiece 44. In this compensator, the quarter-wave plate 56 has its fast axis oriented at 45° to the perpendicular planes of polarization of the superimposed beams, and it converts these beams into counter-rotating circularly polarized beams, which are analyzed by the rotatable analyzer 58. The difference in angular settings of the analyzer 58 for minimum brightness of the object and for minimum brightness of surround, multiplied by two, will give the measure of the optical path difference between the object and its surround.

Figure 8:
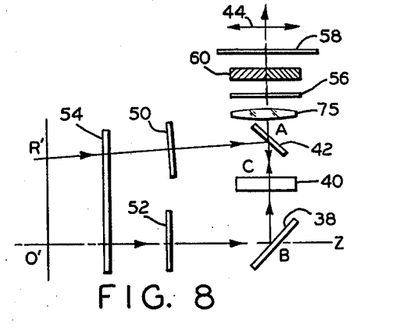
FIGURE 8 is a diagram of the optical system shown in FIGURE 7 incorporating a further modification.

Since exact visual recognition of the precise settings for minimum brightness is a difficult feat for the human eye, the somewhat easier task of comparing the relative brightness of adjacent areas may be employed for the same purpose if a half-shade device 60 is incorporated between the quarter-wave plate 56 and the analyzer 58, as shown in FIGURE 8, device 60 being located at the plane of the final image of the object. Such half-shade devices, which are placed in the focal plane of an auxiliary lens 75, when such a lens is required as an image relay lens in arrangements occupying considerable axial length, may take the form of the Soliel or Nakamura biplate, or of the Koester improved half-shade eyepiece device described in the copending application of C. J. Koester, Serial No. 706,341, filed December 31, 1957, isssued as Patent No. 2,880,648 on April 7, 1959. With these devices, the two halves of the image are brought to equal brightness by adjusting the rotatable analyzer, FIGURES 2A, 2B and 2C of said copending application, and the retardation introduced by the object may thus be measured with improved accuracy.

Figure 9:
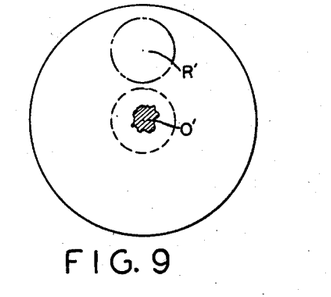
FIGURE 9 is a diagrammatic view of an image produced at an image plane of the apparatus of the present invention.

FIGURE 9 is a schematic representation of the two portions of the image plane surrounding the points O' and R' which are to be superimposed by the interference eyepieces of the present invention.

When the object plane is illuminated by collimated light from a slit light source 32 centered on the optic axis of the instrument, as shown in FIGURE 1, each point in the slit gives rise to a substantially plane wavefront that illuminates the entire object field. To each point in the slit there corresponds a coherent wavefront whose inclination is determined by the location of this point in the slit. For example, the wavefront that emanates from the axial point in the slit is normal to the optic axis. On the other hand, the wavefront that originates from an off axis point in the slit will be correspondingly inclined. The reflection system of FIGURE 2 will function in an excellent manner for that highly restricted set of points that fall on the mid-line of the slit (i.e., for a centered slit of near zero slit-width). It will be observed that the number of reflections suffered by beams R'ACA and O'BCA of FIGURE 2 differ by the odd number unity. Whenever the number of reflections suffered by the interfering beams from R' and O' differ by an odd integer, the effect of the inclined wavefronts is to produce an interference image containing many narrow fringes for light that emanates from points that fall sufficiently far from the mid-line of the centered slit. Fortunately, this appearance of said narrow fringes can be avoided by modifying the reflection system so that the number of reflections of the interfering beams from R' and O' differ by zero or an even number, such as occur at the reflecting surfaces 38, 41a, 41b and 42 in FIGURE 10. It may be said that each reflection reverses the effect of inclination of a plane wavefront or of departure from a plane wavefront, and that if two beams follow paths differing by an odd number of reflections the effects of such inclination or departure will be enhanced so that the interference image may contain many narrow fringes. An even difference in the number of reflections, however, causes the adverse effects of such inclinations or departures to be cancelled, producing much broader interference fringes, whose widths can be controlled by the relative angular adjustments of elements 38, 41 and 42 in FIGURE 10 as the slit-width is increased.

Figure 10:
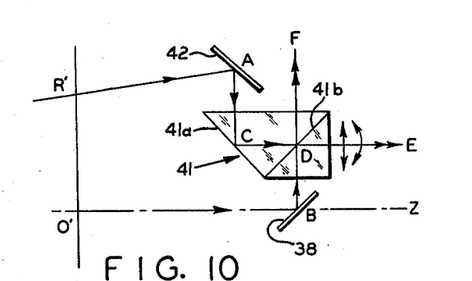
FIGURE 10 is a diagram of the optical system of another embodiment of the invention incorporating a different combining element incorporating both totally reflecting and partially reflecting surfaces.

In the combination illustrated in FIGURE 10, a modified form of the present invention is shown incorporating a different element 41 for combining the two beams. Element 41 has a substantially totally reflecting or full-silvered surface 41a positioned to reflect the reference beam AC along line CD, and a partially reflecting or half-silvered surface 41b so positioned that part of beam CD passes through surface 41b along line DE while the remainder of beam CD is reflected along line DF. Simultaneously, the particle beam BD is split by surface 41b, part of this beam passing through surface 41b along line DF, and the remainder being reflected along line DE. Thus if the ocular is located at point E, each beam undergoes two reflections, while if the ocular is located at the alternative position F, the reference beam undergoes three reflections while the particle beam undergoes one reflection. The even difference in the number of reflections of each beam thus accomplishes the desirable result of minimizing the adverse effects of minor imperfections in the optical system and of slit-width, as discussed at length above. Surfaces 41a and 41b may be incorporated in the compound prism 41 shown in FIGURE 10. They could also be respectively a full-silvered mirror and a half-silvered mirror, mounted in a movable frame replacing compound prism 41.

Element 41 may be movable in the direction BF for coarse adjustments in the relative optical path length of the two beams, and fine adjustments may be achieved by inserting a rotatable transparent plate in the path of beam R'A, as shown in FIGURE 3. Alternatively, the combining element 41 may itself be made rotatable, as indicated in FIGURE 10. If element 41 rotates about point D, for example, a slight rotation will lengthen or shorten line AC slightly, while leaving the other segments of both optical paths substantially unchanged.

Figure 11:
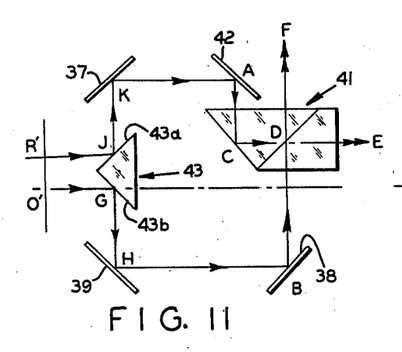
FIGURE 11 is a diagram of the optical system shown in FIGURE 10 incorporating additional mirrors and a prism to improve the effectivenes of the combination.

A modification of the invention which is particularly useful with a combining element such as the compound prism 41 is shown schematically in FIGURE 11, where the beams R'J and O'G are so close together that element 41 cannot conveniently be fitted between them. Here beam R'J is reflected along path JKA by elements 43 and 37, while beam O'G is reflected along path GHB by elements 43 and 39. This arrangement provides ample space for element 41, and also for its movement in translation and rotation to adjust the relative optical path lengths of the two beams.

Figure 12:
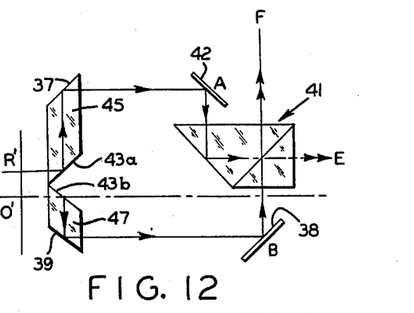
FIGURE 12 is a diagram of the optical system of FIGURE 10 incorporating a different mirror-prism system.

A similar separation of optical paths may be achieved by other combinations of mirrors and prisms, such as the configuration shown in FIGURE 12. Here the surfaces 43a and 43b are not surfaces of a central prism 43, as shown in FIGURE 11, but instead are provided by adjacent opposed prisms 45 and 47, whose opposite ends form reflecting surfaces 37 and 39 respectively.

Figure 13:
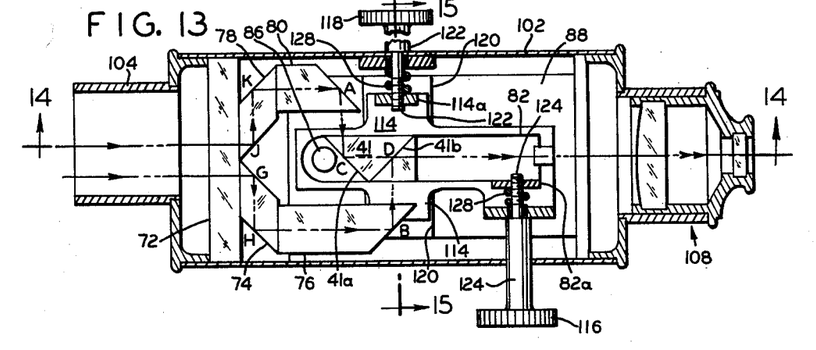
FIGURE 13 is a sectional front elevation of an interference eyepiece incorporating an embodiment of the invention similar to that shown in FIGURE 10.
Figure 14:
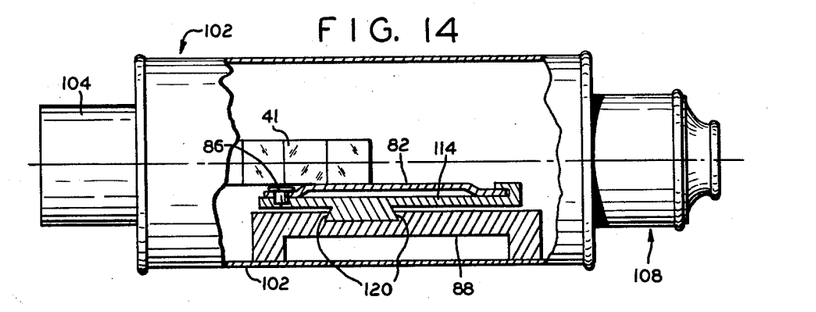
FIGURE 14 is a bottom plan view, partially in section, of the interference eyepiece shown in FIGURE 13.
Figure 15:
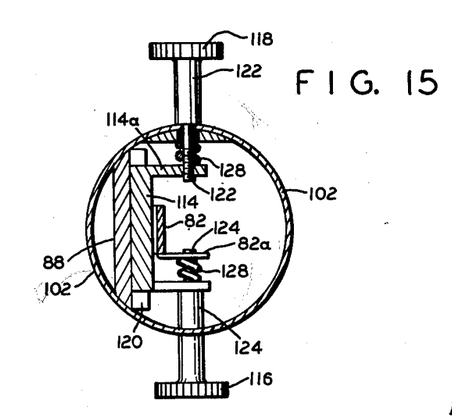
FIGURE 15 is a sectional end elevation of the interference eyepiece of FIGURE 13.

One mechanism for producing both translation and rotation of compound prism 41 is shown in FIGURES 13, 14 and 15, where another prism arrangement provides the beam separation described above. Here a housing 102 is provided with a projecting annular flange 104 adapting the housing to be inserted in the open end of a microscope barrel (not shown) from which the eyepiece has been removed. Flange 104 surrounds and forms an entrance aperture open to the light passing through the microscope. A transparent cover plate 72 is mounted in the end of housing 102, and fixed prisms 74, 76, 78 and 80 are mounted in housing 102 in such a manner that the light entering prisms 74 will follow the path GHBD via prisms 74 and 76 to the half-silvered surface 41b of compound prism 41, from which part of this light will be reflected toward viewing eyepiece 108. Simultaneously the light entering prism 78 will follow the path JKAC via prisms 78 and 80 to reflecting surface 41a of compound prism 41, from which this light will be reflected and superimposed upon the other portion of the light passing through prisms 74 and 76 to form an interference image observable in the viewing eyepiece.

The translation and rotation adjustments of compound prism 41 may be accomplished by any suitable mechanism, such as the device shown in FIGURES 13, 14 and 15. Here compound prism 41 is mounted on a supporting frame 82 which is made tiltable about an axis (preferably parallel to the slit light source 32 shown in FIGURE 1) by being rotatably mounted upon pivot or pin 86. This pin is rotatably secured to a translatable base 114 slidably mounted in a grooved track or slide 120 formed in member 88, which is joined to housing 102.

Any suitable mechanism for actuating the rotation and translation adjustment of compound prism 41 may be employed. In the embodiment shown in FIGURES 13, 14 and 15, translation is provided by turning knob 118. This rotates shaft 122, which is threaded into a mating tapped hole in flange 114a, thereby causing base 114 to slide transversely along track 120. Similarly, rotation of element 41 is provided by turning knob 116. This rotates shaft 124, which is threaded into a mating tapped hole in flange 82a, thereby causing frame 82 to rotate about pin 86. If smaller amounts of finer adjustment are desired, suitable gear trains may be installed between knob 118 and threaded shaft 122, and between knob 116 and threaded shaft 124. Springs 128 counteract any play or slack which may develop in the mating threads of shafts 122 and 124 and their respective flanges.

Examples of embodiments incorporating a different form of beam splitter as a combining element to bring the beams from the different parts of the image into superposition are shown schematically in FIGURES 16, 17, 18 and 19. In the systems shown in these figures, the combining element is a double-image prism 62, such as a Wollaston prism, employed to receive the two properly oriented beams AC and BD, and to combine them by refraction into a beam PE directed toward the eyepiece, not shown. The angle α between the beams AC and BD is selected to permit the double-image prism to combine these beams as required.

The Wollaston prism will perform this combining operation in the manner shown only for the components of the two beams which are polarized in planes perpendicular to each other and properly oriented relative to the inclined internal refracting surface of the prism. Therefore, superfluous components of light may be eliminated by inserting polarizers 64 and 66 into beams AC and BD respectively, as shown in FIGURE 16, these polarizers being oriented to pass only the desired components to the Wollaston prism 62.

On the other hand, if polarizers 64 and 66 are omitted, the components of the two beams oriented in other than the desired planes will be differently refracted by the prism itself, and they will diverge as they leave the prism. Thus they may be conveniently blocked by a diaphragm 68 provided with an opening adapted to pass only the desired combined beam PE, as shown in FIGURE 17.

Figure 16:
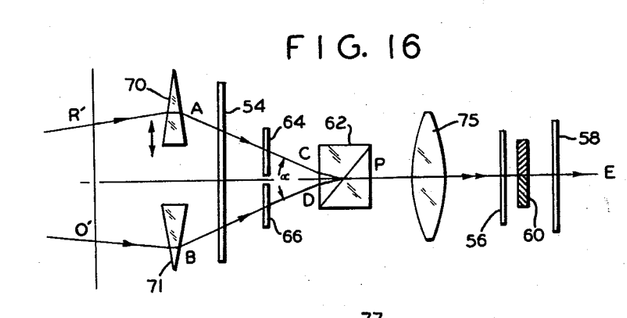
FIGURE 16 is a diagram of an optical system of a different embodiment of the present invention employing a Wollaston or double-image prism as a combining element.

If polarizers 64 and 66 are used in place of diaphragm 68, the relative amplitudes of the two beams can be changed and equalized by inserting a rotatable polarizer 54 across the paths of both beams, as shown in FIGURE 16. Rotation of polarizer 54 will then change or equalize the relative amplitudes of beams AC and BD, as explained above with reference to FIGURE 5.

Figure 7:
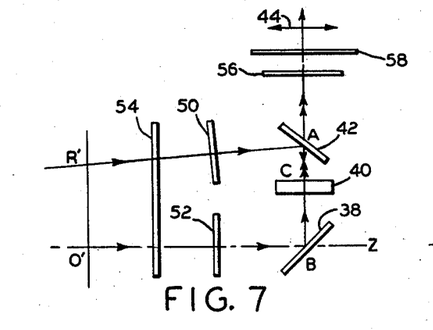
FIGURE 7 is a diagram of the optical system of the modified embodiment shown in FIGURE 5 incorporating certain additional elements particularly useful with polarized light.

Another advantage of the system shown in FIGURE 16 incorporating polarizers 64 and 66 is the fact that the combination may be used with the half-shade eyepiece elements 75, 56, 58 and 60, employed as described above with reference to FIGURE 8. The Senarmont type compensator elements 56 and 58 as shown in FIGURE 7 may also be used without the half-shade element 60, if desired.

Figure 17:
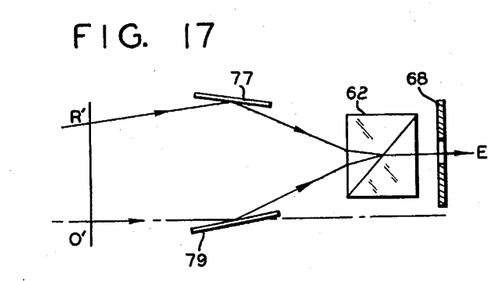
FIGURE 17 is a diagram of the optical system of the embodiment shown in FIGURE 16, with certain modifications.
Figure 18:
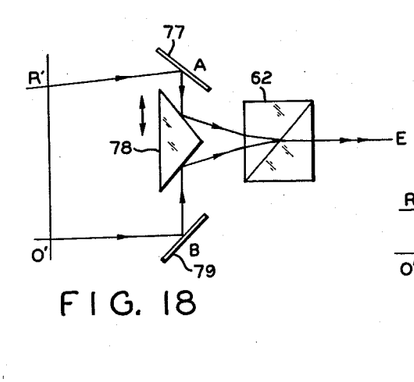
FIGURE 18 is a diagram of the optical system of the embodiment shown in FIGURE 16 with certain further modifications.

Three different combinations of elements which may be used to direct the beams into the Wollaston prism 62 are shown in FIGURES 16, 17 and 18. In FIGURE 16, two refracting prisms 70 and 71 are employed, and if one of these prisms such as prism 70 is movably adjustable in a direction normal to the optic axis of the system, fine adjustment of the relative optical path length of the two beams may thus be made. If prism 70 is moved upward, for example, the refraction angles of its two faces will be unchanged, but the distance travelled by the beam in passing through the prism will be increased.

As shown in FIGURE 17, a pair of properly oriented mirrors 77 and 79 may be used to direct the two beams into the Wollaston prism 62. If desired the mirrors may direct the beams instead upon an intermediate prism 73 whose faces are cut to direct the separate beams into the Wollaston prism 62 at the required angles, as indicated in FIGURE 18. This intermediate prism 73 may be movable in a direction normal to the optical axis of the system in order to adjust the relative optical path lengths of the two beams. Other optical path compensators, such as those shown in FIGURES 3 and 4 may also be combined with these systems when desired.

Figure 19:
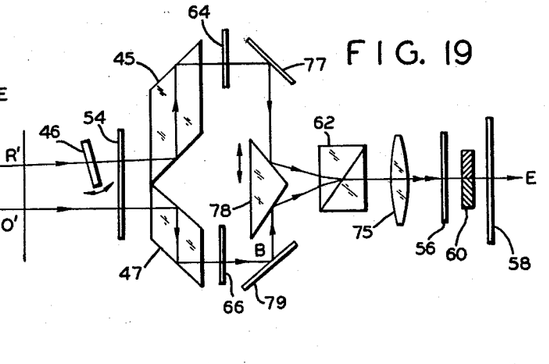
FIGURE 19 is a diagram of an optical system of an embodiment of the invention substantially combining the features shown in FIGURES 12 and 18.

The two beams are often inconveniently close together as they approach the image plane, and they may advantageously be separated by such reflecting combinations as those shown in FIGURES 11 and 12. Thus, for example, FIGURE 19 shows an embodiment of the invention incorporating prisms 45 and 47 to separate the two beams, and mirrors 77 and 79 to redirect them to adjustable intermediate prism 78, which reflects them into Wollaston prism 62 at the required angles. Perpendicular polarizers 64 and 66 cooperate to polarize the beams as required for the Wollaston prism, while adjustable polarizer 54 permits their relative amplitude to be varied. The interference effects introduced by the phase retardation of the object particle may be measured by employing half-shade eyepiece elements 75, 56, 58 and 60, as described above, and fine adjustment of the relative optical path lengths may be accomplished by rotating adjustable transparent plate 46 in one of the beams.

In all of the embodiments described, it will be seen that the basic principle of superimposing two separate portions of the image has been accomplished in a variety of ways, giving great flexibility in the selection and adjustment of optical elements while achieving the important objectives of the invention. Furthermore all of the optical elements of the interferometer eyepiece may be incorporated in a housing such as that shown in FIGURES 13, 14 and 15, thereby permitting a conventional microscope or other optical instrument to be adapted for interferometric observations by the addition of a relatively simple and inexpensive optical unit. The invention also requires that the object plane be illuminated with light that is coherent at all points of the object plane. This may be accomplished by illuminating the object plane with the diffraction image of a pin hole or slit as shown in the drawings or through the use of any other coherent light source such as a laser.

In the embodiments of the invention shown in the drawings, the only essential element necessarily located outside the interference eyepiece housing is the diaphragm preferably incorporating a slit light "source" 32, which is preferably positioned in the first focal plane of the condenser lens 34 with the slit being normal to the plane of the paper on which the other figures appear, and therefore perpendicular to the incident planes of the various reflecting surfaces in the interference eyepiece itself. In the systems shown, this arrangement of the slit 32 produces the necessary coherent illumination of the entire object plane.

The selection of the two portions of the image to be superimposed may be aided by blocking one of the beams, as described above, and various techniques may be employed to increase the choice of image areas. If the microscope is equipped with a rotating specimen stage, the stage and specimen may be rotated until suitable image areas are found. If a plurality of objective lenses are available, a change of magnification will often facilitate the selection of image areas. If it is desired to adapt the interferometer eyepiece itself for image area selection, various optical elements in the eyepiece may be made movable. Thus, in FIGURES 2, 3, 4, 5, 7, 8, 10, 11, 12, 18 and 19, the reflecting surfaces 42 or 77 could be made adjustably movable in a direction normal to the optical axis of the system. This would conveniently permit the selection of reference or comparison image areas without disturbing the elements affecting the beam from the object particle.

By making possible the elimination of the various non-homogeneous anisotropic or birefringent elements employed in conventional interference microscopes, the adverse effects of these elements upon the focused image may be avoided in the present invention. Furthermore, the coarse and fine relative path length adjustments made available by this invention permit compensation for minor aberrations and inaccuracies in the various elements of the entire system, as pointed out above. Thus, the present invention produces superior focusing, contrast and extinction of the image, while using optical elements with less critical manufacturing tolerances. The present invention therefore achieves better results than conventional interference microscopes, and permits substantial economies in manufacturing.

The interferometer eyepieces of the present invention are not by any means limited to microscopes, for they may be employed with any optical system where interferometry must be performed. For example, the present invention may be employed to measure the spherical aberration of a telescope, or to compare for phase differences two portions of an image produced by any optical instrument.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An interference microscope optical system comprising, in combination, an objective and a condenser disposed in longitudinally spaced optically aligned relation to each other at opposite sides of a predetermined object plane in said system, said objective being positioned so as to focus upon an object field at said object plane and to form an image of said object field at an image plane of said objective in predetermined spaced conjugate relation thereto, an opaque diaphragm disposed in said optical system substantially at a transverse plane containing the first principal focus of said condenser, a relatively small narrow slit formed in said diaphragm and disposed in optical alignment with said condenser so that said slit and said condenser will jointly serve to direct a beam of substantially parallel coherent light from all points in said slit toward all parts of said object field and said objective when said slit is illuminated by light from a conventional microscope light source aligned therewith, said beam of coherent light at said object plane being of sufficient size to illuminate a first specimen area of predetermined size and a second reference area of similar size in said object field in laterally spaced relation to each other, said objective being arranged to direct image-forming light rays from said first and second laterally spaced areas along separate paths toward spaced locations in said image plane, light beam directing and combining means optically disposed in said system so as to receive said image-forming light rays, said light beam directing and combining means including a plurality of light-reflecting members and a light-combining member, at least one of which light-reflecting members is disposed in each of said paths of said image-forming light rays respectively, and positioned so as to direct the light rays of said two paths toward said light-combining member, said light-combining member being positioned so as to receive light rays of both paths and having such optical and physical characteristics as to direct such light rays of both paths in superimposed relation with each other along a common path, an eye lens disposed in said common path and optically aligned with said system so as to focus upon said image plane, said plurality of light-reflecting members and said light-combining members being so controlled that the difference between the number of reflecting surfaces for the light rays of one of said spaced paths relative to the number of reflecting surfaces of the light rays of the other of said spaced paths will in no instance provide an odd number of reflections, and path length varying means for varying the optical length of one of said spaced paths relative to the other, whereby an image of said specimen at said object plane will be provided at said eye lens and the optical characteristics thereof may be altered relative to its surround by adjustment of said path length varying means.

2. The interference microscope defined in claim 1 in which said opaque diaphragm, said light beam directing and combining means, said path length varying means and said eye lens are all removably insertable in the microscope system, whereby said system is adapted for both interference microscopy and conventional microscopy.

3. The combination defined in claim 1 in which said light-combining member includes a partially reflecting mirror.

4. The combination defined in claim 1 in which said light-combining member is formed of birefringent material.

5. The combination defined in claim 1 in which said light beam directing and combining means includes a refracting element disposed in each of said spaced paths.

6. The combination defined in claim 1 in which said light beam directing and combining means includes a mirror disposed in each of said paths and said light combining meber is a partially reflecting mirror.

7. The combination defined in claim 1 in which said narrow slit extends in a transverse direction which is substantially perpendicular to a plane passing through said specimen area and said reference area and which also includes the plane of incidence of said light-reflecting members.

8. The combination defined in claim 7 including a variable light-modifying element positioned in one of the paths of light rays from one of said areas for varying the optical length of the path in which same is disposed.

9. The combination defined in claim 7 including light-analyzing means interposed in said paths of light rays for measuring the phase difference between the light rays from said specimen area and the light rays from said reference area.

References Cited in the file of this patent

UNITED STATES PATENTS

| | | |
|---|---|---|
| 2,601,175 | Smith | June 17, 1952 |
| 2,660,922 | Philpot | Dec. 1, 1953 |
| 2,685,228 | Kavanaugh | Aug. 3, 1954 |
| 2,764,055 | Clemens et al. | Sept. 25, 1956 |
| 2,770,166 | Gabor | Nov. 13, 1956 |
| 2,821,881 | Svensson | Feb. 4, 1958 |
| 2,858,728 | Jonnard | Nov. 4, 1958 |
| 2,924,142 | Nomarski | Feb. 9, 1960 |
| 2,950,649 | Horn | Aug. 30, 1960 |

FOREIGN PATENTS

| | | |
|---|---|---|
| 355,911 | Great Britain | Sept. 3, 1931 |

UNITED STATES PATENT OFFICE
CERTIFICATE OF CORRECTION

Patent No. 3,162,713                      December 22, 1964

Harold Osterberg et al.

It is hereby certified that error appears in the above numbered patent requiring correction and that the said Letters Patent should read as corrected below.

In the grant, lines 1 and 2, for "Charles J. Koester, of South Woodstock, Connecticut, and Harold Osterberg, of "Sturbridge, Massachusetts," read -- Harold Osterberg, of Sturbridge, Massachusetts, and Charles J. Koester, of South Woodstock, Connecticut, --; in the heading of each of the four sheets of drawings for "C. J. KOESTER ETAL" read -- H. OSTERBERG ETAL --; in the heading to the printed specification, lines 3 and 4, for "Charles J. Koester, South Woodstock, Conn., and Harold Osterberg, Sturbridge, Mass.," read -- Harold Osterberg, Sturbridge, Mass., and Charles J. Koester, South Woodstock, Conn., --.

Signed and sealed this 4th day of May 1965.

(SEAL)
Attest:

ERNEST W. SWIDER                      EDWARD J. BRENNER
Attesting Officer                 Commissioner of Patents